3,180,704
PROCESS OF MAKING ACTINIDE SULFIDE AND SIMILAR COMPOUNDS

Yehuda Baskin, Chicago, Ill., assignor to the United States of America as represented by the United States Atomic Energy Commission
No Drawing. Filed May 24, 1963, Ser. No. 283,122
10 Claims. (Cl. 23—14.5)

This invention deals with the preparation of refractory actinide compounds, such as the phosphides, arsenides, sulfides, selenides, tellurides, antimonides and bismuthides, and in particular of thorium, uranium and plutonium. Hereinafter the symbol "QZ" will be used for the sake of simplicity to designate the compounds to which the process of this invention is directed. In this the symbol Q stands for one atom of thorium, uranium or plutonium and Z stands for one atom of any of the elements of Group VA or VIA of the Periodic System.

Compounds of the class just specified may be used as fuel of nuclear reactors which operate at high temperatures. Some of these compounds have been made heretofore by mixing powders of the actinides and elements of Groups VA and VIA of the Periodic System and sintering for reaction of the components. Such a process is the subject matter, for instance, of U.S. Patent No. 1,893,296, granted to Williams C. Lilliendahl et al. on January 3, 1933. According to this patented process, uranium and phosphorus powders, the phosphorus in an excess of the amount stoichiometrically required, are compressed and then heated in an autoclave after the latter has been evacuated and hermetically sealed. This patented process results in a clinkerlike material of high porosity, probably due to the formation and occlusion of bubbles of phosphorus gas; such a porous phosphide, however, is not suitable for reactors where high density of the fuel is of prime importance. The clinkers obtained by the patented process must be broken up and resintered in order to obtain a material of sufficiently high density. This patented process often leads to phosphides higher than the monophosphide, which are also undesirable for reactor use and would have to be treated further to convert them to the monophosphide.

Apart from these drawbacks, the process of the patent is not suitable for the preparation of arsenides or sulfides, because, it was found, no reaction whatever takes place between actinide and arsenic or sulfur powders when the teachings of the patent are followed.

It is an object of this invention to provide a process for the reaction of actinides with nonmetals to form compounds of the formula QZ which can be carried out without the use of an inert atmosphere or without the use of reduced gas pressure.

It is another object of this invention to provide a process for the preparation of actinide compounds of the formula QZ by which a high-density product is obtained, so that an aftertreatment, for instance powdering plus resintering, is not necessary.

It was found that actinide compounds of almost theoretical density and great mechanical strength can be produced if metal and nonmetal are used in about stoichiometric amounts with respect to the equiatomic compounds for reaction at elevated temperature and if the reaction is carried out under the influence of a mechanical load, e.g. an impact, and at conditions that permit any gas formed to escape. The term equiatomic compounds is to embrace actinide monosulfides, monoarsenides, etc.

The process of this invention comprises mixing actinide metal powder and nonmetal powder of Group VA and/or VIA in stoichiometric quantities as to the equiatomic compound to be produced, introducing the mixture into a die, applying a mechanical load to the reaction mixture, and heating it in the die to a temperature of between 340 and 440° C., whereby a spontaneous exothermic reaction takes place which brings the temperature instantaneously and momentarily to above melting temperature, so that the reaction product obtained is softened and then compressed by the load; and cooling the product. A dense and strong refractory material is obtained.

Actinide metals can be used per se or in combination with actinide compounds, such as mononitrides or monocarbides. These compounds are isomorphic with the equiatomic compounds to be formed and form a solid solution therewith. As to the nonmetals, all elements of Group VA or VIA are suitable. Instead of using only one actinide metal, a mixture of uranium and plutonium or other combinations of the three actinides mentioned in the introduction can be used.

A refractory metal powder can be added to the reaction mixture prior to reaction, if desired.

As mentioned, all starting materials are used in pulverized form. The actinide powders can be made by mechanical means or, as is known to the art, by chemical processes, for instance by hydriding-dehydriding cycles.

Various apparatus can be used for the pressure reaction of the powdered mixture. For the experiments that led to this invention, a graphite die was used, into which punches, one spring-loaded, fitted with a slightly loose fitting to allow escape of vapors of phosphorus, etc. However, a waxlike seal that had a relatively high melting point was applied around the die in order to prevent inleakage of oxygen.

The temperature to which the material has to be heated depends on the reactants and their particle sizes. Generally, a temperature between 340 and 440° C. was found suitable. When the proper temperature was attained, a punch of the die was spring-loaded, whereby an impact was exerted on the material. The load, which may be in the form of a sudden impact, preferably ranged between 4,000 and 10,000 p.s.i. This brings about a flashlike reaction. The temperature usually soars to 2500° C. or higher, softens the material, and the spring-loaded punch or other compacting means at the same time densifies the reaction product. Both branches of the temperature-time curve for this reaction and cooling to room temperature proceed in an almost vertical angle, the cooling-off period being almost as sudden as the reaction flash section.

Apart from the desirability of applying a seal between punch and die to avoid reaction of the actinide metals with the atmosphere, no further precautions are necessary, and an inert atmosphere around the apparatus is not required. The density of the products formed was at least 86% of the theoretical density.

In the following, a few examples are given for illustrative purposes.

Example 1

Five grams of uranium metal powder and 0.65 gram of red amorphous phosphorus powder were mixed and loaded into a graphite mold having an inner diameter of 0.5 inch and being equipped with two punches, one of which was spring-operated. The die was introduced into a glove box containing an inert atmosphere. The reaction mixture was precompacted there at room temperature by applying a pressure of 5,000 p.s.i. to the material in the die.

Then the mold was taken out of the glove box, sealing wax was applied around the punches and the mold was then placed in a press heated by an external furnace. A pressure of 5,000 p.s.i. was applied to the sample while heating it to a temperature of 440° C. A flash occurred, indicating that the reaction had taken place. The sample was allowed to cool to room temperature and then removed from the mold.

The product weighed 5.3 grams, had a volume of 0.595 cc. and a density of 8.95 g./cc., which is 88% of the theoretical density. Analysis by X-ray proved it to be predominantly uranium monophosphide, UP. Metallographic examination showed a uniform texture. The product proved inert to air.

*Example II*

The experiment of Example I was repeated with arsenic power instead of phosphorus.

Ten grams of uranium metal powder and three grams of arsenic powder were used. Reaction took place at 360° C. The product weighed 12.73 grams, had a volume of 1.37 cc. and a density of 9.3 g./cc.; this density is about 86% of the theoretical density. X-ray analysis showed it to be predominantly UAs.

*Example III*

This example was for the preparation of uranium monosulfide, also analogous to the procedure of Example I.

Ten grams of uranium powder and 1.2 grams of sulfur were mixed and reacted at about 340° C. The product weighed 9.95 grams and had a volume of 0.92 cc. and a density of 10.8 g./cc.; this density is about 99% of the theoretical density. X-ray analysis showed the product to be US; metallographic examination confirmed the high uniform density of the product.

It will be understood that the invention is not to be limited to the details given herein but that it may be modified within the scope of the appended claims.

The embodiments of the invention in which an exclusive property or privilege is claimed are defined as follows:

1. A process of producing equiatomic compounds of actinide metal and nonmetal selected from the class consisting of elements of Groups VA and VIA of the Periodic System of the Elements, comprising mixing about stoichiometric amounts of powdered actinide metal and said powdered nonmetal; applying a mechanical load of between 4,000 and 10,000 p.s.i. to the reaction mixture and at the same time heating the mixture obtained to between 340 and 440° C., whereby equiatomic compound is formed in an instantaneous exothermic reaction and compressed; and cooling the product to room temperature.

2. The process of claim 1 wherein any gas formed during the reaction is permitted to escape from the reaction mixture.

3. The process of claim 2 wherein the load is applied in the form of a sudden impact.

4. The process of claim 1 wherein the mixture is compacted at room temperature prior to heating it for reaction.

5. The process of claim 1 wherein the actinide is uranium.

6. The process of claim 5 wherein the nonmetal is phosphorus.

7. The process of claim 5 wherein the nonmetal is arsenic.

8. The process of claim 5 wherein the nonmetal is sulfur.

9. The process of claim 1 wherein the actinide is a uranium-plutonium mixture.

10. The process of claim 1 wherein the actinide is a thorium-uranium mixture.

References Cited by the Examiner

UNITED STATES PATENTS

| | | | |
|---|---|---|---|
| 1,893,296 | 1/33 | Lilliendahl et al. | 23—204 |
| 2,569,225 | 9/51 | Carter et al. | 23—14.5 |
| 2,948,923 | 8/60 | La Rocca et al. | |
| 3,087,877 | 4/63 | Goeddel et al. | 176—89 X |

OTHER REFERENCES

"Zeitschrift für Amorganische U. Allegemeine," Band 247, 1941, pp. 422–423.

CARL D. QUARFORTH, *Primary Examiner.*